United States Patent [19]
Hsu

[11] Patent Number: 5,930,902
[45] Date of Patent: Aug. 3, 1999

[54] SAW WITH A REMOVABLE SAW BLADE

[76] Inventor: An-Sun Hsu, No. 99, Yu-Ai St., Tainan City, Taiwan

[21] Appl. No.: 09/096,156

[22] Filed: Jun. 11, 1998

[51] Int. Cl.⁶ ....................................................... B26B 1/04
[52] U.S. Cl. .............................. 30/331; 30/166.3; 30/321; 30/337
[58] Field of Search .......................... 30/160, 161, 166.3, 30/329, 330, 331, 155, 156, 157, 320, 321, 340, 342, 337, 519

[56] References Cited

U.S. PATENT DOCUMENTS

| | | | |
|---|---|---|---|
| 156,369 | 10/1874 | Millspaugh | 30/517 |
| 601,480 | 3/1898 | Powell | 30/517 |
| 3,900,950 | 8/1975 | Collins | 30/337 |
| 4,169,312 | 10/1979 | Mar | 30/337 |
| 4,425,709 | 1/1984 | Quenzi | 30/151 |
| 4,750,267 | 6/1988 | Boyd | 30/161 |
| 5,092,045 | 3/1992 | Boyd, Jr. et al. | 30/161 |
| 5,722,168 | 3/1998 | Huang | 30/161 |

FOREIGN PATENT DOCUMENTS

| | | | |
|---|---|---|---|
| 093169 | 8/1948 | France | 30/517 |

*Primary Examiner*—Hwei-Siu Payer
*Attorney, Agent, or Firm*—Harness, Dickey & Pierce, P.L.C.

[57] ABSTRACT

A saw includes an elongated saw blade having a rear end portion which is formed with a hooked extension and a locking hole having a restricted entrance. The handle member has left and right side walls which confine a blade receiving space therebetween, and an insert slit for access into the blade receiving space. A pivot shaft extends transversely between the left and right side walls. The rear end portion of the saw blade is extendible into the blade receiving space via the insert slit so that the hooked extension hooks pivotally with the pivot shaft. A locking pin extends movably and transversely between the left and right side walls, and has a wider section with a cross-section larger than the restricted entrance but smaller than the locking hole, and a narrower section with a cross-section smaller than the restricted entrance. The locking pin is movable between an unlocking position, in which the narrower section is registered with the blade receiving space to permit movement of the locking pin into and out of the locking hole via the restricted entrance, and a locking position, in which the wider section is registered with the blade receiving space to engage the locking hole and to lock the saw blade to the handle member.

4 Claims, 6 Drawing Sheets

SAW WITH A REMOVABLE SAW BLADE

BACKGROUND OF THE INVENTION

1. Field of the Invention

This invention relates to a saw, more particularly to a saw having a saw blade that can be easily removed.

2. Description of the Related Art

FIG. 1 illustrates a conventional saw which includes a handle member 2 and a saw blade 1 having a top edge 13 and a teethed bottom edge. The handle member 2 confines a blade receiving space and has a retaining rod 21 and a top flange 22 in the blade receiving space. The retaining rod 21 is spaced from the top flange 22. The handle member 2 further has a threaded hole 25 anteriorly of the retaining rod 21. The handle member 2 is formed with an insert slit 23 which extends from a front side of the handle member 2 to a bottom side of the handle member 2. The saw blade 1 has a rear end portion formed with a rearwardly extending and downwardly curving hooked extension 11, and a locking hole 14 disposed anteriorly of the hooked extension 11. The rear end portion of the saw blade 1 is inserted into the blade receiving space of the handle member 2 via the insert slit 23. The hooked extension 11 extends between the retaining rod 21 and the top flange 22 for hooking on the retaining rod 21, and the top edge 13 of the saw blade 1 abuts against the top flange 22 of the handle member 2, thereby retaining the rear end portion of the saw blade 1 between the retaining rod 21 and the top flange 22. A locking bolt 20 extends through the locking hole 14 and engages the threaded hole 25 of the handle member 2 to lock the saw blade 1 to the handle member 2.

When the saw blade 1 is to be detached from the handle member 2 for replacement with a new one, the locking bolt 20 is operated with the use of a tool, such as a screw driver, for disengaging from the threaded hole 25 and for removal from the locking hole 14, thereby permitting removal of the saw blade 1 from the handle member 2.

Although the above-described conventional saw permits removal of the saw blade 1 for replacement, operation of the locking bolt 20 with the use of a tool during removal of the saw blade 1 from the handle member 2 is necessary.

SUMMARY OF THE INVENTION

The main object of the present invention is to provide a saw which facilitates removal of a saw blade from a handle member.

Accordingly, the saw of the present invention includes a saw blade and an elongated handle member. The saw blade is formed as an elongated flat plate with a top edge, a teethed bottom edge, and a rear end portion which is formed with a rearwardly extending and downwardly curving hooked extension, and a locking hole that is disposed adjacent to the top edge anteriorly of the hooked extension and that has a restricted entrance extending to the top edge. The handle member has left and right side walls which confine a longitudinal blade receiving space therebetween, top and bottom walls which bridge top and bottom ends of the left and right side walls, and front and rear sides interconnecting the top and bottom walls and the left and right side walls. The handle member is formed with an insert slit that extends from the front side to the bottom wall for access into the blade receiving space. The handle member further includes a pivot shaft that extends transversely between the left and right side walls and distant from the front side. The pivot shaft forms a clearance with the top wall. The rear end portion of the saw blade is extendible into the blade receiving space of the handle member from the bottom wall via the insert slit so that the hooked extension extends into the clearance for hooking pivotally with the pivot shaft. The handle member further includes a locking pin that extends transversely between the left and right side walls and that is mounted movably to the left and right side walls so as to be movable therebetween. The locking pin is disposed between the front side and the pivot shaft. The locking pin has a wider section with a cross-section larger than the restricted entrance of the saw blade but smaller than the locking hole, and a narrower section with a cross-section smaller than the restricted entrance. The locking pin is movable between an unlocking position, in which the narrower section is registered with the blade receiving space to permit movement of the locking pin into and out of the locking hole of the saw blade via the restricted entrance and permit upward and downward pivoting movement of the saw blade about the pivot shaft when the hooked extension is hooked on the pivot shaft, and a locking position, in which the wider section is registered with the blade receiving space to engage the locking hole and prevent pivoting movement of the saw blade about the pivot shaft.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
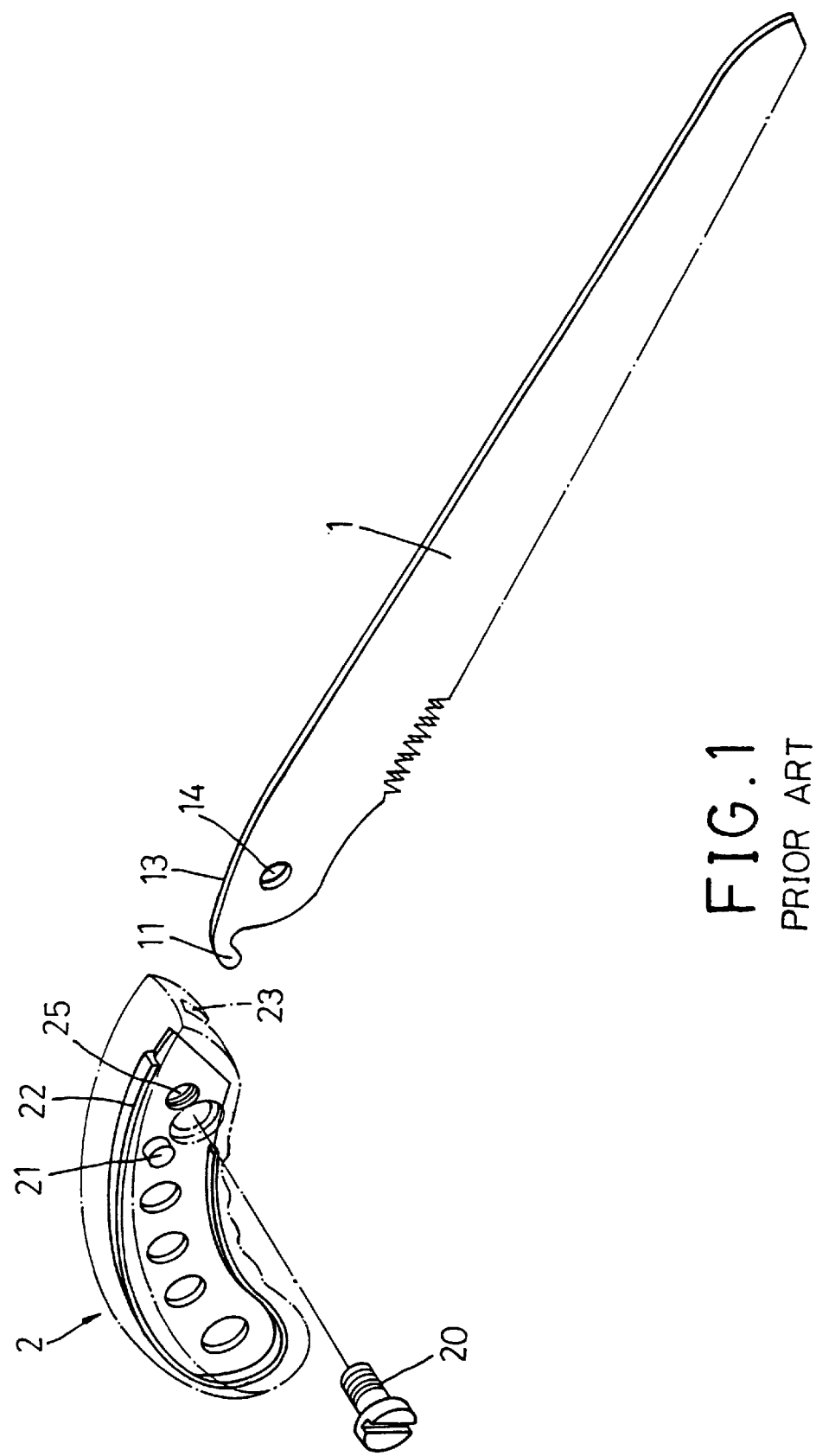
FIG. 1 is an exploded perspective view of a conventional saw.
Figure 2:
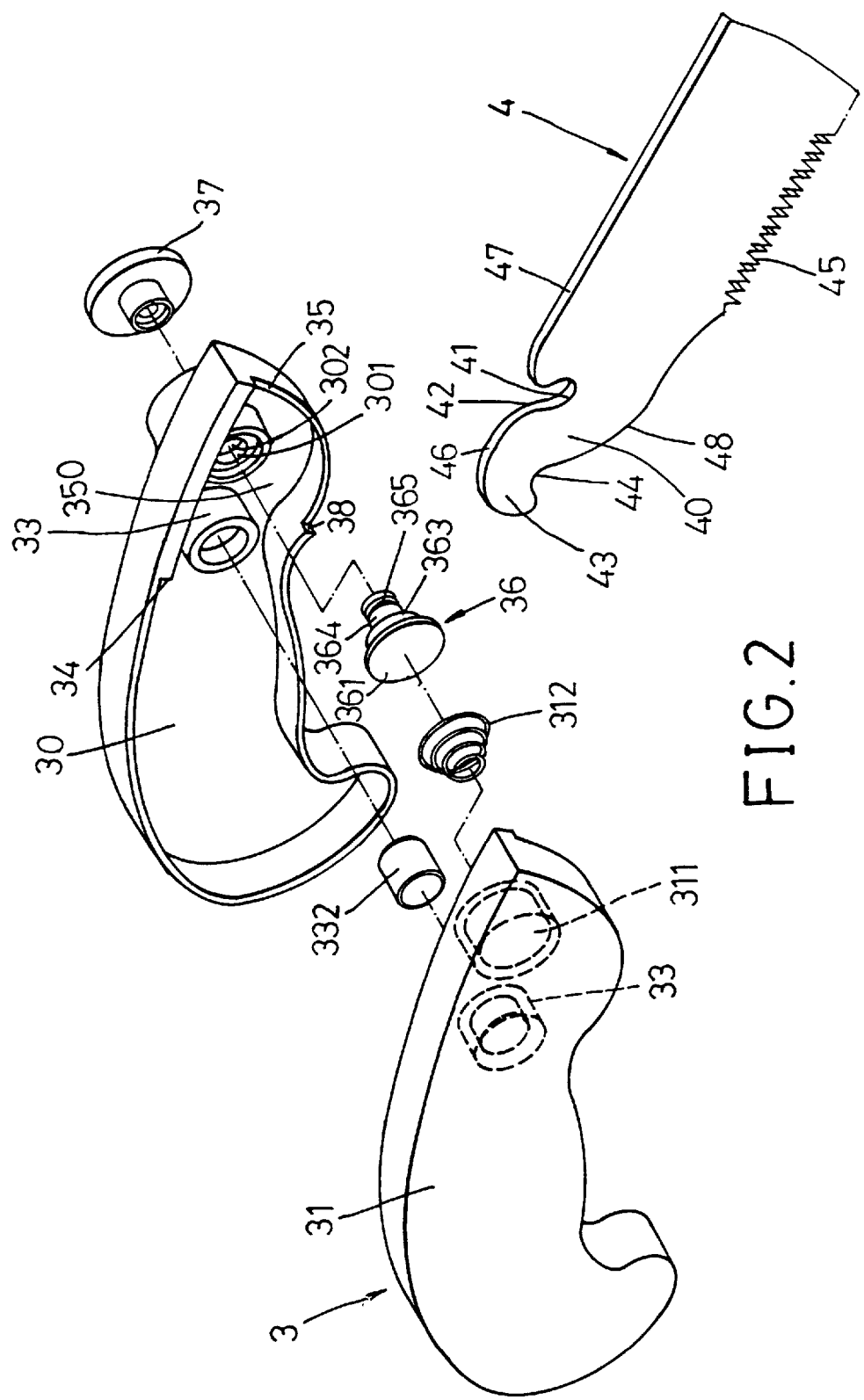
FIG. 2 is an exploded fragmentary perspective view of a preferred embodiment of a saw according to the present invention.

Referring to FIG. 2, the preferred embodiment of the saw according to the present invention is shown to include a saw blade 4 and an elongated handle member 3.

The saw blade 4 is formed as an elongated flat plate with a top edge 47, a teethed bottom edge 45 and a rounded rear end portion 40 which is formed with a rearwardly extending and downwardly curving hooked extension 43 that forms a rounded groove 44. A locking hole 41 is formed adjacent to the top edge 47 anteriorly of the hooked extension 43, and has a restricted entrance 42 which extends to the top edge 47. The hooked extension 43 is confined by a curved top edge section 46 and a curved bottom edge section 48.

Figure 3:
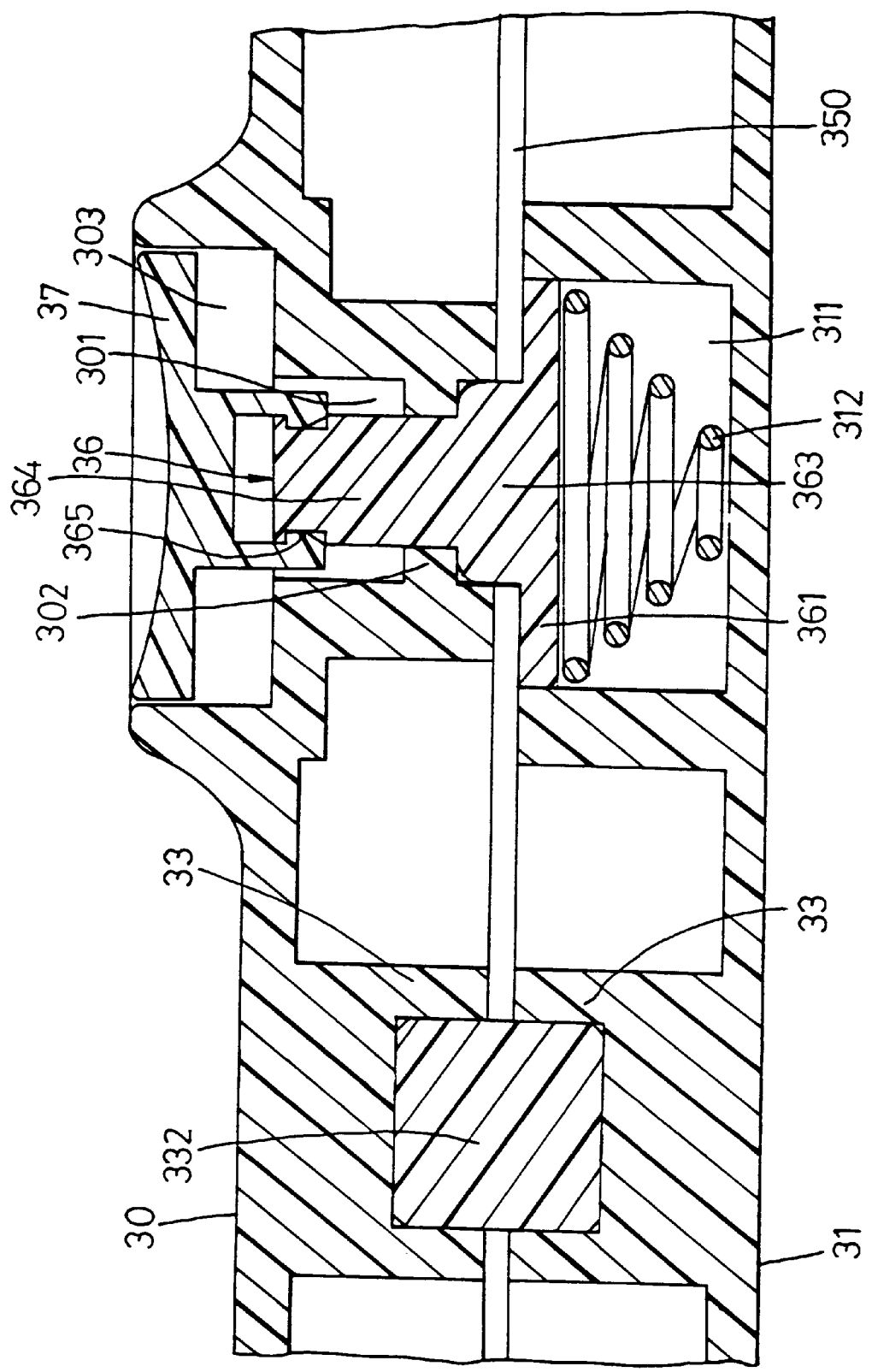
FIG. 3 is a horizontal fragmentary sectional view of the preferred embodiment when viewed from a top side while a locking pin thereof is disposed in a locking position.

Referring to FIGS. 2 and 3, the handle member 3 includes left and right side walls 30, 31 which confine a longitudinal blade receiving space 350 therebetween, top and bottom walls which interconnect top and bottom ends of the left and right side walls 30, 31, and front and rear sides interconnecting the top and bottom walls and the left and right side walls 30, 31. The top wall has a front section formed with a downward stop protrusion 34 that projects downwardly toward the blade receiving space 350. The handle member 3 is further formed with an insert slit 35 which extends from the front side to the bottom wall for access into the blade receiving space 350. An abutment edge 38 is formed on the bottom wall adjacent to one end of the insert slit 35. The left and right side walls 30, 31 are formed with coaxial tubular members 33 for cooperatively receiving a cylindrical pivot shaft 332 which extends transversely between the left and right side walls 30, 31 and which forms a clearance with the stop protrusion 34 on the top wall. The pivot shaft 332 is distant from the front side of the handle member 3 and is disposed above the abutment edge 38 of the bottom wall. The left side wall 30 has a locking hole 301 formed therethrough. The locking hole 301 is disposed anteriorly of the pivot shaft 332, and has a broadened outer section formed as a press-knob recess 303 and an inner section formed with a radial inward stop flange 302. The right side wall 31 is formed with a spring recess 311 aligned with the locking hole 301. A locking pin 36 extends transversely between the left and right side walls 30, 31 and through the locking hole 301, and is disposed between the front side and the pivot shaft 332 of the handle member 3. The locking pin 36 has adjacent narrower and wider sections 364, 363, a first end adjacent to the narrower section 364 and formed with an engaging groove 365 for engaging a press knob 37 which is disposed in the press knob recess 303, and a second end adjacent to the wider section 363 and formed as a widened abutment wall 361. The wider section 363 of the locking pin 36 has a cross-section larger than the restricted entrance 42 of the locking hole 41 but smaller than the locking hole 41. The narrower section 364 has a cross-section smaller than the restricted entrance 42. The locking pin 36 is movable between the left and right side walls 30, 31 to register a selected one of the narrower and wider sections 364, 363 with the blade receiving space 350. A biasing spring 312 is received in the spring recess 311 to abut against the abutment wall 361 of the locking pin 36 for biasing the locking pin 36 away from the right side wall 31.

Figure 4:
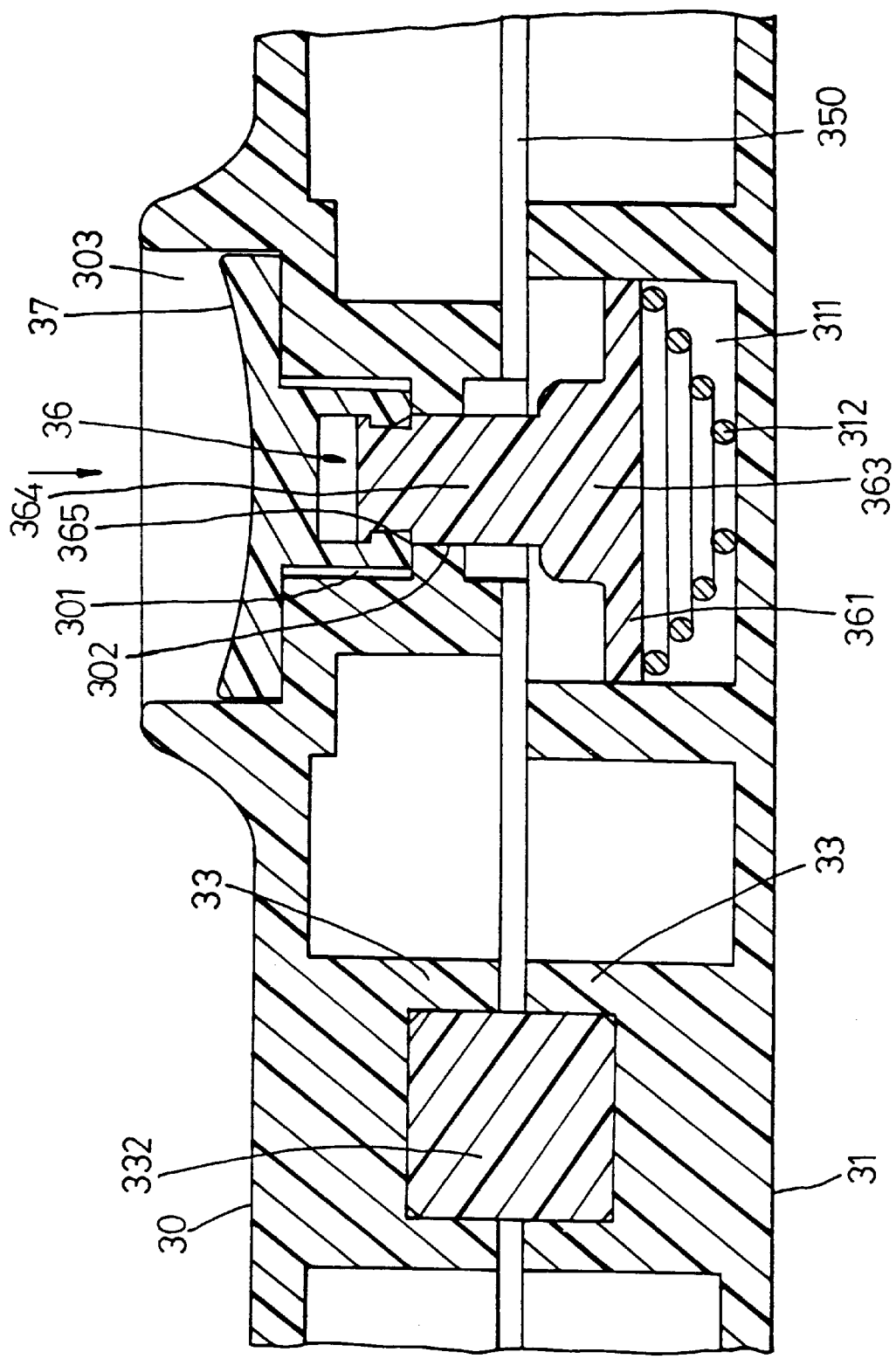
FIG. 4 is a horizontal fragmentary sectional view of the preferred embodiment when viewed from the top side while the locking pin is disposed in an unlocking position.
Figure 5:
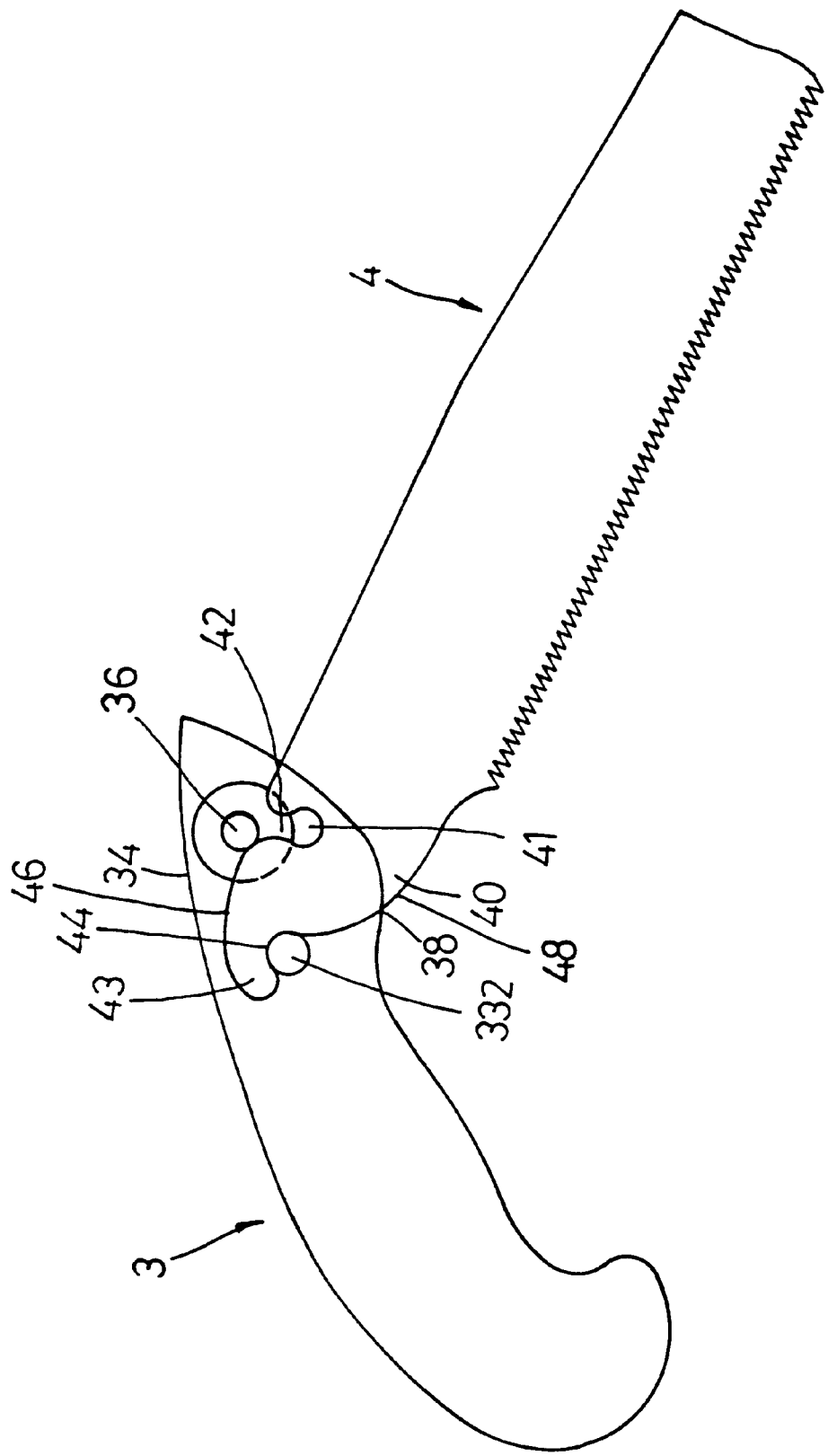
FIGS. 5 and 6 illustrate how a saw blade is assembled to a handle member of the saw of the preferred embodiment.
Figure 6:
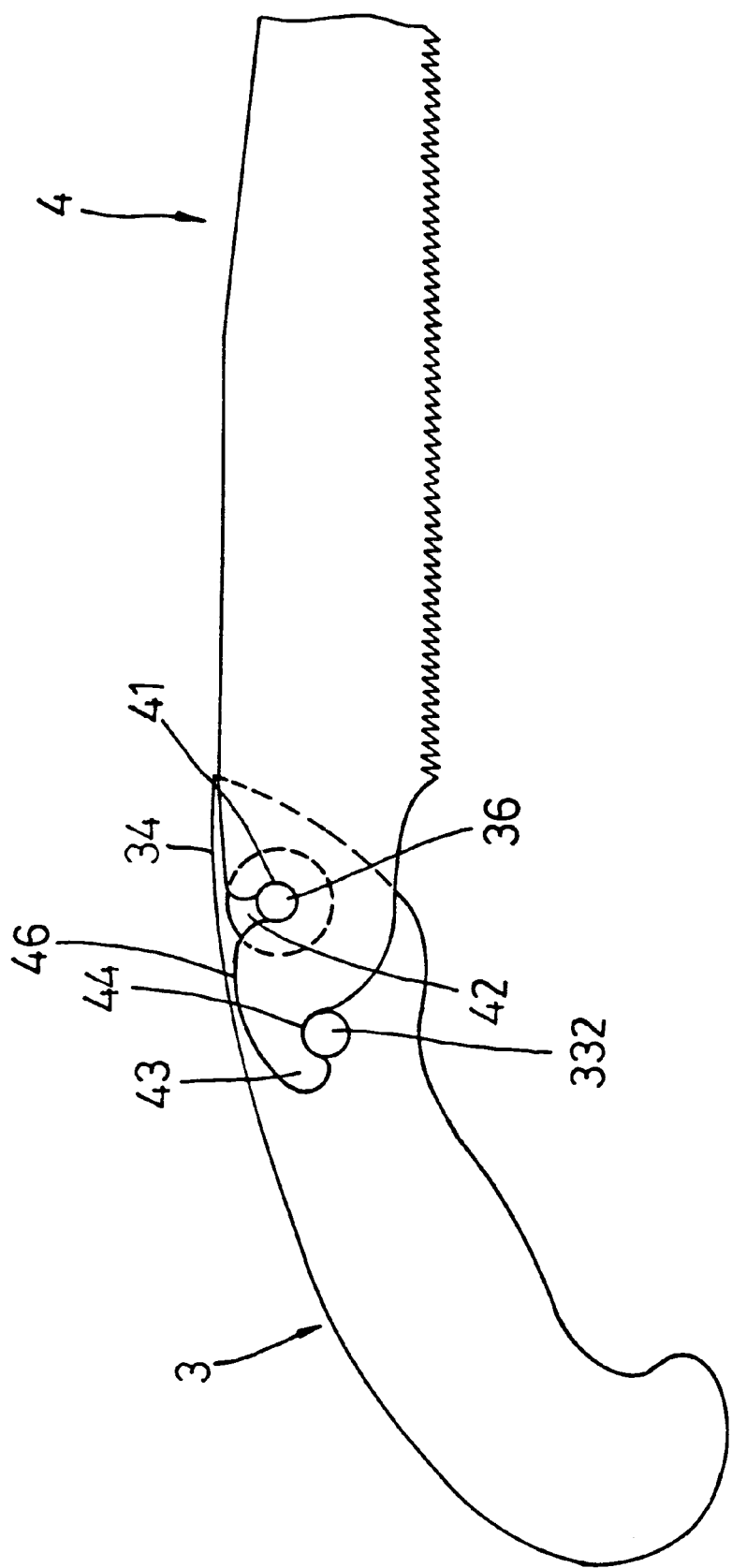

Referring to FIGS. 4 and 5, when assembling the saw blade 4 to the handle member 3, the rear end portion 40 of the saw blade 4 is extended into the blade receiving space 350 from the bottom wall via the insert slit 35 (see FIG. 2) with the bottom edge section 48 of the saw blade 4 abutting against the abutment edge 38 of the handle member 3 so that the hooked extension 43 extends into the clearance between the pivot shaft 332 and the stop protrusion 34 on the top wall of the handle member 3 for hooking pivotally with the pivot shaft 332. The press knob 37 is then operated to move the locking pin 36 toward the right side wall 31 against biasing action of the biasing spring 312 to an unlocking position, in which the narrower section 364 is registered with the blade receiving space 350, as shown in FIG. 4. Under this situation, the locking pin 36 is permitted to move into the locking hole 41 via the restricted entrance 42 since the cross-section of the narrower section 364 is smaller than restricted entrance 42 of the locking hole 41, and the saw blade 4 is permitted to pivot upwardly about the pivot shaft 332 so that the top edge section 46 of the saw blade 4 abuts against the stop protrusion 34 on the top wall of the handle member 3, as shown in FIG. 6. Thereafter, the pressing force applied on the press knob 37 is released so that the locking pin 36 is biased by the biasing spring 312 to a locking position, in which the wider section 363 abuts against the stop flange 302 and is registered with the blade receiving space 350 to engage the locking hole 41, as shown in FIG. 3. Since the cross-section of the wider section 363 is larger than the restricted entrance 42, the locking pin 36 is prevented from passing through the restricted entrance 42, thereby preventing pivoting movement of the saw blade 4 about the pivot shaft 332. The saw blade 4 is locked to the handle member 3 at this time. The stop flange 302 formed on the left side wall 30 prevents removal of the locking pin 36 from the handle member 3.

When the saw blade 4 is to be detached from the handle member 3 for replacement with a new one, the press knob 37 is operated once again to move the locking pin 36 to the unlocking position, as shown in FIG. 4, for removal outwardly of the locking hole 41 via the restricted entrance 42 to permit downward pivoting movement of the saw blade 4 about the pivot shaft 332. The saw blade 4 can thus be removed from the handle member 3 via the insert slit 35.

It has been shown that the saw blade of the saw of the present invention can be removed from the handle member by simply operating the press knob without the need for threading and unthreading a locking bolt, as taught in the aforementioned prior art. The saw of the present invention thus permits replacement of the saw blade in a faster and more convenient manner as compared with the conventional one described beforehand.

With this invention thus explained, it is apparent that numerous modifications and variations can be made without departing from the scope and spirit of this invention. It is therefore intended that this invention be limited only as indicated in the appended claims.

I claim:

1. A saw comprising:

a saw blade formed as an elongated flat plate with a top edge, a teethed bottom edge, and a rear end portion which is formed with a rearwardly extending and downwardly curving hooked extension and a locking hole that is disposed adjacent to said top edge anteriorly of said hooked extension and that has a restricted entrance extending to said top edge; and an elongated handle member having left and right side walls which confine a longitudinal blade receiving space therebetween, top and bottom walls which bridge top and bottom ends of said left and right side walls, and front and rear sides interconnecting said top and bottom walls and said left and right side walls, said handle member being formed with an insert slit that extends from said front side to said bottom wall for access into said blade receiving space, said handle member further including a pivot shaft that extends transversely between said left and right side walls and distant from said front side, said pivot shaft forming a clearance with said top wall, said rear end portion of said saw blade being extendible into said blade receiving space of said handle member from said bottom wall via said insert slit so that said hooked extension extends into said clearance for hooking pivotally with said pivot shaft, said handle member further including a locking pin that extends transversely between said left and right side walls and that is mounted movably to said left and right side walls so as to be movable therebetween, said locking pin being disposed between said front side and said pivot shaft, said locking pin having a wider section with a cross-section larger than said restricted entrance of said saw blade but smaller than said locking hole, and a narrower section with a cross-section smaller than said restricted entrance, said locking pin being movable between an unlocking position, in which said narrower section is registered with said blade receiving space to permit movement of said locking pin into and out of said locking hole of said saw blade via said restricted entrance and permit upward and downward pivoting movement of said saw blade about said pivot shaft when said hooked extension is hooked on said pivot shaft, and a locking position, in which said wider section is registered with said blade receiving space to engage said locking hole and prevent pivoting movement of said saw blade about said pivot shaft.

2. The saw according to claim 1, wherein said handle member further includes a biasing spring for biasing said locking pin from the unlocking position to the locking position.

3. The saw according to claim 2, wherein said narrower section of said locking pin is formed adjacent to said wider section, said locking pin having a first end disposed adjacent to said narrower section, and a second end disposed adjacent to said wider section, said handle member further including a press knob which is mounted on said first end of said locking pin and which is disposed outwardly of said left side wall of said handle member, said press knob being operable to move said locking pin from the locking position to the unlocking position against action of said biasing spring, said biasing spring being mounted on said right side wall and abutting against said second end of said locking pin for biasing said locking pin from the unlocking position to the locking position.

4. The saw according to claim 3, wherein said left side wall is provided with stop means for abutting against said wider section of said locking pin when said locking pin is in the locking position to prevent removal of said locking pin from said handle member.

* * * * *